United States Patent
Mizutani et al.

(10) Patent No.: US 8,759,743 B2
(45) Date of Patent: Jun. 24, 2014

(54) INPUT DEVICE

(71) Applicant: Nitto Denko Corporation, Ibaraki (JP)

(72) Inventors: Toru Mizutani, Ibaraki (JP); Naoki Shibata, Ibaraki (JP); Yusuke Shimizu, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 148 days.

(21) Appl. No.: 13/629,816

(22) Filed: Sep. 28, 2012

(65) Prior Publication Data
US 2013/0087691 A1    Apr. 11, 2013

(30) Foreign Application Priority Data
Oct. 7, 2011    (JP) ................. 2011-222699

(51) Int. Cl.
*G01J 1/04* (2006.01)
*G06F 3/042* (2006.01)

(52) U.S. Cl.
CPC ............. *G01J 1/0425* (2013.01); *G06F 3/0421* (2013.01)
USPC ..................................... 250/227.11; 385/101

(58) Field of Classification Search
USPC ................. 250/227.11, 227.14; 361/45, 87; 324/96; 385/101, 106
See application file for complete search history.

(56) References Cited

U.S. PATENT DOCUMENTS

2011/0297817 A1* 12/2011 Nagafuji et al. ......... 250/227.28
2011/0310634 A1* 12/2011 Nagafuji et al. .............. 362/610

FOREIGN PATENT DOCUMENTS

JP    3682109 B2    8/2005

* cited by examiner

*Primary Examiner* — Seung C Sohn
(74) *Attorney, Agent, or Firm* — Westerman, Hattori, Daniels & Adrian, LLP (57) ABSTRACT

An input device capable of lowering the vertical position of light beams traveling within the frame of a frame-shaped optical waveguide without using optical path conversion is provided. The input device includes a light-emitting module incorporating a light-emitting element connected to light-emitting cores of the optical waveguide, and a light-receiving module incorporating a light-receiving element connected to light-receiving cores of the optical waveguide. A section of the optical waveguide on a light-receiving side, in which the light-receiving cores are formed, is placed upside down so that an over cladding layer is positioned on the underside. Accordingly, the light-receiving module is also placed upside down. Thus, the light-receiving module protrudes along the height thereof in such a manner that the amount of downward protrusion is less than the amount of upward protrusion.

4 Claims, 8 Drawing Sheets

RELATED ART

FIG. 7B

RELATED ART

FIG. 8

INPUT DEVICE

BACKGROUND OF THE INVENTION

1. Field of the Invention

The present invention relates to an input device including an optical position detection means.

2. Description of the Related Art

Conventionally, an optical position detection device (as disclosed in, for example, Japanese Patent No. 3682109) including a plurality of light-emitting elements and a plurality of light-receiving elements is proposed as an input device. This optical position detection device is in the form of a rectangular frame comprised of a pair of L-shaped sections. The light-emitting elements are disposed in juxtaposition in one of the L-shaped sections of the rectangular frame, and the light-receiving elements opposed to the light-emitting elements are disposed in juxtaposition in the other L-shaped section thereof. The rectangular frame-shaped optical position detection device is placed along the periphery of a rectangular display. Information such as a character is inputted to the optical position detection device and is caused to appear on the rectangular display by moving a pen within the rectangular frame of the optical position detection device.

Specifically, the light-emitting elements cause light beams to travel in a lattice form within the rectangular frame. When a pen is moved within the rectangular frame, some of the light beams emitted from the light-emitting elements are intercepted by the tip of the pen. The light-receiving elements opposed to the light-emitting elements sense the interception of light beams to thereby detect the path of the tip of the pen (input information such as a character). The path is outputted as a signal to the rectangular display.

The light-emitting elements and the light-receiving elements of the optical position detection device have a certain amount of thickness, and the optical position detection device includes the light-emitting elements and the light-receiving elements disposed in juxtaposition in the form of a frame. For this reason, the frame is accordingly thick. To reduce the thickness of the frame, an input device including an optical waveguide used for the frame has been proposed (for example, Japanese Patent Application No. 2011-139481).

Figure 7A:
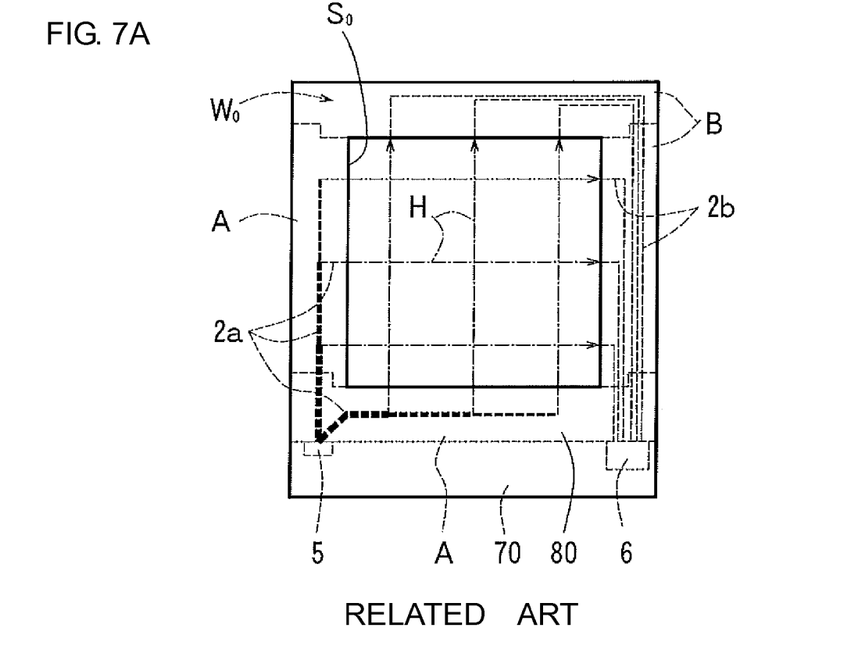
FIG. 7A is a plan view schematically showing a conventional input device.
Figure 7B:
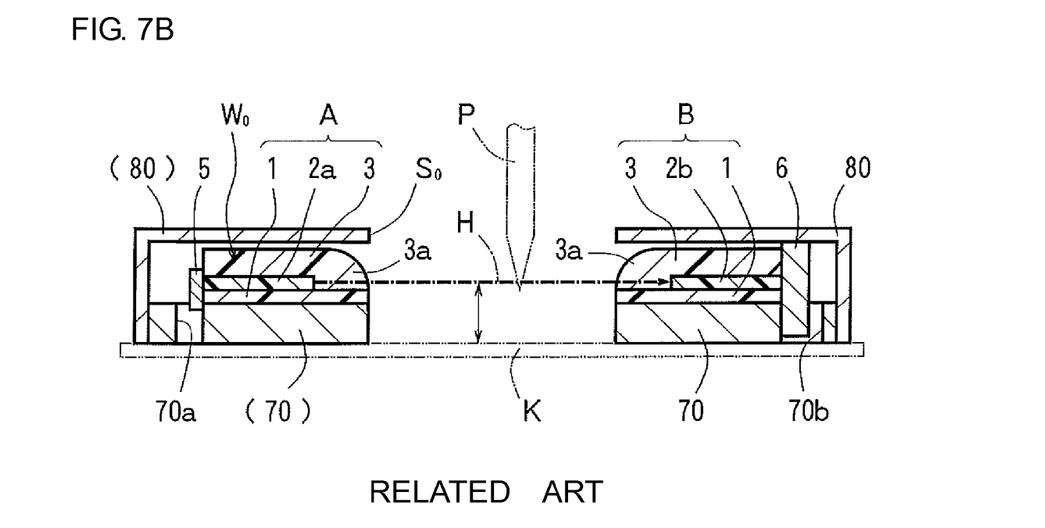
FIG. 7B is a sectional view more schematically showing the conventional input device.

FIG. 7A is a plan view schematically showing the conventional input device, and FIG. 7B is a sectional view showing the conventional input device more schematically (although the positions of a light-emitting module 5 and a light-receiving module 6 are shown as differing from those in FIG. 7A for the purpose of showing more schematically). As shown in FIGS. 7A and 7B, the input device includes a rectangular frame-shaped optical waveguide $W_0$ having a hollow input-use interior $S_0$, and the light-emitting and light-receiving modules 5 and 6 connected to the optical waveguide $W_0$. The light-emitting module 5 is configured such that a light-emitting element is mounted on a wiring board, and the light-receiving module 6 is configured such that a light-receiving element is mounted on a wiring board. The optical waveguide $W_0$ and the light-emitting and light-receiving modules 5 and 6 are provided on the front surface of a rectangular frame-shaped retainer plate 70 having the hollow input-use interior $S_0$, and are covered with a rectangular frame-shaped protective plate 80 having the hollow input-use interior $S_0$.

The rectangular frame of the optical waveguide $W_0$ is comprised of a pair of L-shaped sections. One of the L-shaped sections serves as a light-emitting side A, and the other L-shaped section serves as a light-receiving side B. In the rectangular frame-shaped optical waveguide $W_0$, an under cladding layer 1 is in the form of a rectangular frame comprised of a pair of L-shaped sections. Light-emitting cores 2a are disposed in a divided manner on a surface of one of the L-shaped sections of the rectangular frame of the under cladding layer 1, and light-receiving cores 2b are disposed in juxtaposition on a surface of the other L-shaped section thereof. An over cladding layer 3 is formed on the surface of the under cladding layer 1 so as to cover the light-emitting cores 2a and the light-receiving cores 2b. The front end surfaces of the respective light-emitting cores 2a and the front end surfaces of the respective light-receiving cores 2b are positioned on inner edges of the pair of L-shaped sections (the inner periphery of the rectangular frame), and are in opposed relation to each other. An edge portion of the over cladding layer 3 covering the front end surfaces of the cores 2a and 2b is in the form of a convex lens portion 3a having a substantially quadrantal curved surface as seen in sectional side view.

A connection between the optical waveguide $W_0$ and the light-emitting module 5 is established, with a light-emitting section of the light-emitting element connected to the rear ends of the respective light-emitting cores 2a. A connection between the optical waveguide $W_0$ and the light-receiving module 6 is established, with a light-receiving section of the light-receiving element connected to the rear ends of the respective light-receiving cores 2b. Light beams H from the light-emitting section of the light-emitting element pass through the light-emitting cores 2a, and exit the front ends of the light-emitting cores 2a. Upon exiting, the light beams H travel in a lattice form within the rectangular frame (the hollow input-use interior $S_0$) of the rectangular frame-shaped optical waveguide $W_0$. Then, the light beams H enter the front ends of the light-receiving cores 2b, pass through the light-receiving cores 2b, and reach the light-receiving section of the light-receiving element.

In general, the light-receiving element is greater in size than the light-emitting element. The light-receiving module 6, in general, is accordingly greater in size than the light-emitting module 5. Also, the optical waveguide $W_0$, in general, is made thin. Because of these facts, there are cases where the light-receiving module 6 protrudes downwardly from the optical waveguide $W_0$ (toward the retainer plate 70) when the light-receiving module 6 is connected to the optical waveguide $W_0$. In such cases, as shown in FIG. 7B, the retainer plate 70 is made thick, and a through hole 70b or a recess is formed in part of the retainer plate 70 corresponding to the light-receiving module 6 to receive the protruding part of the light-receiving module 6 therein. In this manner, the light-receiving module 6 is prevented from protruding from the back surface of the retainer plate 70. In this conventional input device, the light-emitting module 5 also protrudes downwardly slightly from the optical waveguide $W_0$. A through hole 70a or a recess is formed in the retainer plate 70 to receive the protruding part of the light-emitting module 5 in a manner similar to the protruding part of the light-receiving module 6.

However, when an inputter (user) places the input device, for example, on a paper sheet K and inputs a character or the like with a pen P into part of the paper sheet K revealed within the hollow input-use interior $S_0$ where the light beams H travel in the lattice form as mentioned above, the retainer plate 70 made thick as mentioned above causes the light beams H to travel in a vertical position high above the surface of the paper sheet K. If the inputter moves the tip of the pen P out of contact with the surface of the paper sheet K with the intention of stopping the input operation, the tip of the pen P continues intercepting light beams, so that the path of the tip of the pen P out of contact with the surface of the paper sheet K is inputted despite the intention of the inputter. To stop the input operation, it is hence necessary for the inputter to move the tip of the pen P far from the surface of the paper sheet K. This results in an unnatural input operation. The conventional input device still has room for improvement in this regard.

SUMMARY OF THE INVENTION

Figure 8:
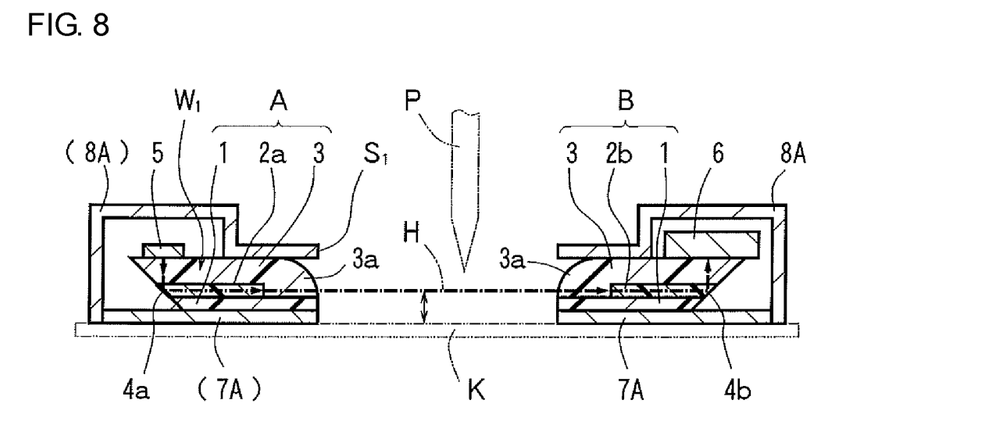
FIG. 8 is a sectional view schematically showing an input device.

The present inventors have hence invented an input device in which the rear end of each light-receiving core $2b$ is in the form of a reflecting surface $4b$ inclined at 45 degrees, and in which the light-receiving module 6 is disposed on part of a surface of the over cladding layer 3 corresponding to the position lying over the reflecting surface $4b$, as shown in sectional view in FIG. 8, for the purpose of causing the light beams H to travel in a vertical position low above the surface of the paper sheet K. In the input device shown in FIG. 8, the rear end of each light-emitting core $2a$ is also in the form of a reflecting surface $4a$ inclined at 45 degrees, and the light-emitting module 5 is disposed over the reflecting surface $4a$. Specifically, a light beam H in this input device is initially emitted downwardly from the light-emitting section of the light-emitting element, and is reflected in a horizontal direction by the reflecting surface $4a$ of each light-emitting core $2a$ so that an optical path conversion is made. Thereafter, the light beam H passes through each light-emitting core $2a$, and exits the front end of each light-emitting core $2a$. Then, the outgoing light beam H passes through the inside of the rectangular frame (a hollow input-use interior $S_1$) of an optical waveguide $W_1$. Thereafter, the light beam H enters the front end of each light-receiving core $2b$, and passes through each light-receiving core $2b$. The light beam H is then reflected upwardly by the reflecting surface $4b$ of each light-receiving core $2b$ so that an optical path conversion is made. Finally, the light beam H reaches the light-receiving section of the light-receiving element. In this input device, the light-receiving module 6 does not protrude downwardly from the optical waveguide $W_1$ because the light-receiving module 6 is disposed over the optical waveguide $W_1$. This allows a retainer plate 7A to be made thin. As a result, the vertical position of the light beams H traveling within the rectangular frame of the optical waveguide $W_1$ is lowered. In FIG. 8, the reference character 8A designates a protective plate.

However, this input device is disadvantageous in that optical losses are increased in some cases due to the reflection (optical path conversion) of light beams from the reflecting surfaces $4a$ and $4b$. This input device still has room for improvement in this regard.

In view of the foregoing, an input device is provided which is capable of lowering the vertical position of light beams traveling within the frame of a frame-shaped optical waveguide without using optical path conversion.

The input device comprises: a retainer plate in the form of a frame; an optical waveguide in the form of a frame, the optical waveguide being provided on a front surface of the retainer plate in such a manner that the frame of the optical waveguide is aligned with the frame of the retainer plate, the optical waveguide having first and second sections opposed to each other in the form of the frame, the first section including light-emitting cores disposed in a predetermined pattern, the second section including light-receiving cores disposed in a predetermined pattern, the light-emitting cores and the light-receiving cores having respective front end surfaces positioned on inner edges of the frame, the front end surfaces of the light-emitting cores and the front end surfaces of the light-receiving cores being opposed to each other, the optical waveguide further including an over cladding layer having an edge portion covering the front end surfaces of the light-emitting and light-receiving cores, the edge portion of the over cladding layer being in the form of a lens portion; a light-emitting element connected to the rear ends of the light-emitting cores of the optical waveguide; and a light-receiving element connected to the rear ends of the light-receiving cores of the optical waveguide, the light-receiving element including a light-receiving section disposed in an upper part thereof, the light-receiving element having a lower end portion positioned closer to the retainer plate, the optical waveguide having a light-receiving optical waveguide section in which the light-receiving cores are formed, the light-receiving optical waveguide section and the light-receiving element being placed upside down so that the light-receiving section is positioned in a lower part of the light-receiving element and so that the lower end portion of the light-receiving element is positioned above the light-receiving optical waveguide section, whereby light beams emitted from the light-emitting element, passing through the light-emitting cores, exiting the lens portion of the over cladding layer covering the front end surfaces of the light-emitting cores, and traveling within the frame of the optical waveguide are designed so that the vertical position of the light beams is low with respect to the back surface of the retainer plate.

In the input device, the light-receiving optical waveguide section and the light-receiving element are placed upside down so that the light-receiving section is positioned in a lower part of the light-receiving element and so that the lower end portion of the light-receiving element is positioned above the light-receiving optical waveguide section. A light-receiving module incorporating the light-receiving element thereby does not protrude toward the retainer plate (downwardly) from the light-receiving optical waveguide section or protrudes in the upward and downward directions (along the height) of the light-receiving module with respect to the light-receiving optical waveguide section in such a manner that the amount of protrusion toward the retainer plate (downwardly) is less than the amount of protrusion toward the opposite side (upwardly). This eliminates the need to make the retainer plate on which the optical waveguide is provided thick, thereby lowering the vertical position of the light beams traveling within the frame of the optical waveguide with respect to the back surface of the retainer plate. Additionally, the input device is not required to use optical path conversion, thereby preventing the increase in optical losses. Thus, when an inputter (user) places the input device, for example, on a paper sheet so that the back surface of the retainer plate is in contact with the paper sheet and brings the tip of a pen into contact with the surface of the paper sheet so as to input a character or the like with the pen into part of the paper sheet revealed within the frame of the optical waveguide, some of the light beams traveling within the frame of the optical waveguide are intercepted by the tip of the pen, so that the character or the like is inputted. On the other hand, when the inputter moves the tip of the pen slightly out of contact with the surface of the paper sheet with the intention of stopping the input operation, the light beams are no longer intercepted, so that the input operation is not performed. Thus, the input device allows the inputter to perform a proper and natural input operation as intended by the inputter.

Preferably, at least a light-receiving part of the inner periphery of the frame-shaped retainer plate protrudes inwardly from the inner periphery of the frame-shaped optical waveguide. In such a case, light beams reflected from the surface of the paper sheet which have an adverse effect on the sensing of the light-receiving element are prevented from entering the lens portion of the over cladding layer. As a result, the input operation with high accuracy is achieved.

Preferably, the frame-shaped optical waveguide is covered with a frame-shaped protective plate, and at least a light-receiving part of the inner periphery of the frame-shaped protective plate protrudes inwardly from the inner periphery of the frame-shaped optical waveguide. In such a case, light beams coming from above the optical waveguide which have an adverse effect on the sensing of the light-receiving element are prevented from entering the lens portion of the over cladding layer. As a result, the input operation with higher accuracy is achieved properly.

DETAILED DESCRIPTION OF THE INVENTION

Preferred embodiments according to the present invention will now be described in detail with reference to the drawings.

Figure 1A:
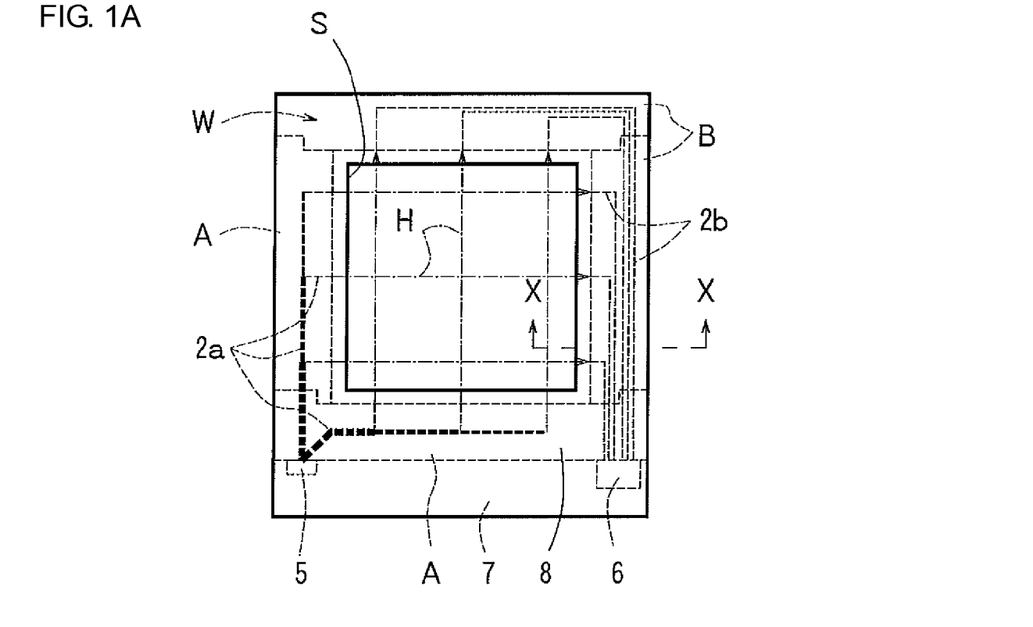
FIG. 1A is a plan view schematically showing an input device according to a first preferred embodiment.
Figure 1B:
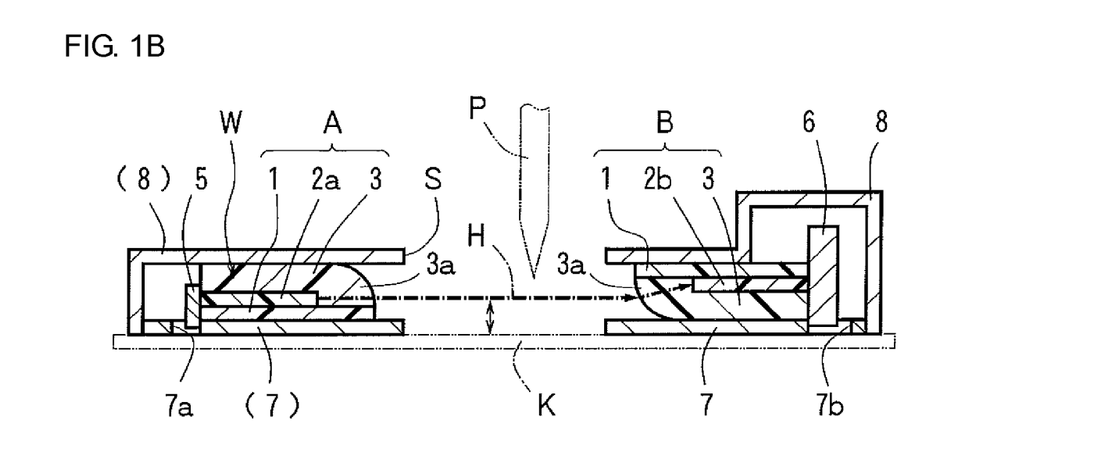
FIG. 1B is a sectional view more schematically showing the input device.

FIG. 1A is a plan view schematically showing an input device according to a first preferred embodiment. FIG. 1B is a sectional view more schematically showing the input device to facilitate understanding (although the positions of a light-emitting module 5 and a light-receiving module 6 are shown as differing from those in FIG. 1A for the purpose of showing more schematically). The input device according to the first preferred embodiment is configured such that an optical waveguide section on a light-receiving side B, in which light-receiving cores 2b are formed, is placed upside down relative to the aforementioned conventional input device shown in FIGS. 7A and 7B, so that an over cladding layer 3 is positioned on the underside (closer to a retainer plate 7). Accordingly, the light-receiving module 6 is also placed upside down. The light-receiving module 6 thereby does not protrude downwardly from the optical waveguide section on the light-receiving side B of an optical waveguide W (toward the retainer plate 7) or protrudes along the height (in the upward and downward directions) of the light-receiving module 6 with respect to the optical waveguide section on the light-receiving side B in such a manner that the amount of downward protrusion (toward the retainer plate 7) is less than the amount of upward protrusion (toward the opposite side) (although the light-receiving module 6 is shown in FIG. 1B as protruding slightly downwardly). This eliminates the need to make the retainer plate 7 on which the optical waveguide W is provided thick, thereby lowering the vertical position of light beams H traveling within the rectangular frame of the optical waveguide W with respect to the back surface of the retainer plate 7. It should be noted that part of the light-emitting module 5 and part of the light-receiving module 6 which protrude downwardly from the optical waveguide W are received in through holes 7a and 7b or recesses formed in the retainer plate 7 as in the aforementioned conventional input device.

When an inputter (user) places the input device having such a configuration, for example, on a paper sheet K so that the back surface of the retainer plate 7 is in contact with the paper sheet K and brings the tip of a pen P into contact with the surface of the paper sheet K so as to input a character or the like with the pen P into part of the paper sheet K revealed within the rectangular frame of the optical waveguide W, some of the light beams H traveling within the rectangular frame of the optical waveguide W are intercepted by the tip of the pen P, so that the character or the like is inputted. On the other hand, when the inputter moves the tip of the pen P slightly out of contact with the surface of the paper sheet K with the intention of stopping the input operation, the light beams H are no longer intercepted, so that the input operation is not performed. Thus, the input device allows the inputter to perform a proper and natural input operation as intended by the inputter.

Further, in the first preferred embodiment, the inner periphery of the rectangular frame-shaped retainer plate 7 and the inner periphery of a rectangular frame-shaped protective plate 8 protrude inwardly from the inner periphery of the rectangular frame-shaped optical waveguide W. Thus, the inner periphery of the retainer plate 7 prevents light beams reflected from the surface of the paper sheet K, which have an adverse effect on the sensing of a light-receiving element of the light-receiving module 6, from entering a lens portion 3a of the over cladding layer 3. Also, the inner periphery of the protective plate 8 prevents light beams coming from above the optical waveguide W, which have an adverse effect on the sensing of the light-receiving element of the light-receiving module 6, from entering the lens portion 3a of the over cladding layer 3. As a result of these configurations, the accuracy of the input of characters and the like is improved.

This will be described in further detail. The optical waveguide W is configured such that strip-shaped optical waveguide sections are produced individually and then connected together into the shape of the rectangular frame. In the first preferred embodiment, end edges of each of the strip-shaped optical waveguide sections have step portions. Adjacent ones of the optical waveguide sections, which are positioned relative to each other using the step portions, are connected to each other. The interior of the frame of the rectangular frame-shaped optical waveguide W serves as a rectangular hollow input-use interior (window) S.

The optical waveguide W in the form of the rectangular frame is comprised of a pair of L-shaped sections. One of the L-shaped sections serves as a light-emitting side A, and the other L-shaped section serves as the light-receiving side B. On the light-emitting side A, light-emitting cores 2a are disposed in a divided manner on a surface of an under cladding layer 1, and the over cladding layer 3 is formed to cover the light-emitting cores 2a. On the light-receiving side B, the light-receiving cores 2b are disposed in juxtaposition on a surface of the over cladding layer 3, with the over cladding layer 3 positioned on the underside (closer to the retainer plate 7), and the under cladding layer 1 is formed to cover the light-receiving cores 2b. The front end surfaces of the respective light-emitting cores 2a and the front end surfaces of the respective light-receiving cores 2b are positioned on inner edges of the pair of L-shaped sections (the inner periphery of the rectangular frame), and are in opposed relation to each other. In the first preferred embodiment, each of the front ends of the light-emitting cores 2a and the light-receiving cores 2b is in the form of a convex lens portion having a substantially semicircular curved surface as seen in plan view, and an edge portion of the over cladding layer 3 covering the lens portions is in the form of the convex lens portion 3a having a substantially quadrantal curved surface as seen in sectional side view. In the first preferred embodiment, the vertical position of the light-emitting cores 2a differs from the vertical position of the light-receiving cores 2b because the thickness of the under cladding layer 1 differs from the thickness of the over cladding layer 3. However, the proper transmission of light beams is achieved by the refraction through the lens portion 3a of the over cladding layer 3. In FIG. 1A, the cores 2a and 2b are indicated by broken lines, and the thickness of the broken lines indicates the width of the cores 2a and 2b. Also, in FIGS. 1A and 1B, the number of cores 2a and 2b is shown as abbreviated.

The rear ends of the respective light-emitting cores 2a and the rear ends of the respective light-receiving cores 2b are positioned outside the corners of the rectangular frame. The light-emitting module 5 is connected to the rear ends of the light-emitting cores 2a, and the light-receiving module 6 is connected to the rear ends of the light-receiving cores 2b. The light-emitting module 5 is configured such that a light-emitting element such as a VCSEL (vertical cavity surface emitting laser) is mounted on a wiring board such as a glass epoxy board, and a light-emitting section of the light-emitting element is connected to the rear ends of the light-emitting cores 2a. The light-receiving module 6 is configured such that the light-receiving element such as a CMOS (complementary metal-oxide-semiconductor) sensor is mounted on a wiring board such as a glass epoxy board, and a light-receiving section of the light-receiving element is connected to the rear ends of the light-receiving cores 2b.

Figure 2:
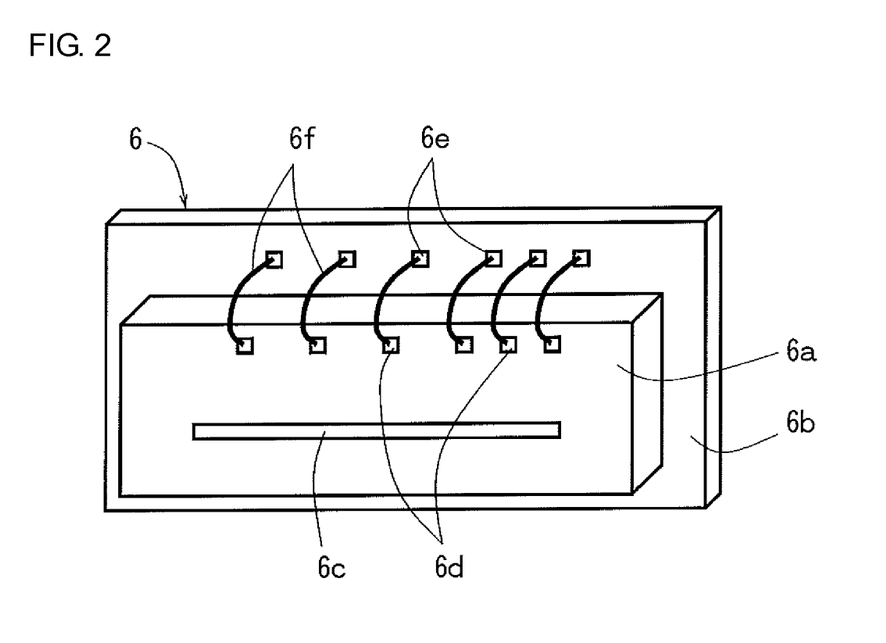
FIG. 2 is a perspective view schematically showing an example of a light-receiving module.

In the light-receiving module 6 connected as described above, a rectangular plate-like light-emitting element 6a is mounted on a surface of a rectangular plate-like wiring board 6b, for example, as shown in perspective view in FIG. 2. A light-receiving section 6c for connection to the rear ends of the light-receiving cores 2b (with reference to FIGS. 1A and 1B) is formed in a lower portion of a surface of the light-emitting element 6a, and light-receiving element pads 6d are formed in an upper portion thereof. Wiring board pads 6e are formed in an upper portion of the surface of the wiring board 6b. The light-receiving element pads 6d of the light-emitting element 6a and the wiring board pads 6e of the wiring board 6b are electrically connected to each other with bonding wires 6f.

As shown in FIGS. 1A and 1B, the optical waveguide W connected to the light-emitting module 5 and the light-receiving module 6 is provided on the front surface of the rectangular frame-shaped retainer plate 7 having the hollow input-use interior S, and are covered with the rectangular frame-shaped protective plate 8 having the hollow input-use interior S. The input device is thus configured.

In the input device having such a configuration, light beams from the light-emitting element of the light-emitting module 5 pass through the light-emitting cores 2a, travel via the lens portions at the front ends of the respective light-emitting cores 2a, and exit the surface of the lens portion 3a of the over cladding layer 3 covering the lens portions of the respective light-emitting cores 2a. Upon exiting, the outgoing light beams H travel in a lattice form in the region within the hollow input-use interior S of the rectangular frame-shaped optical waveguide W. The light beams H traveling in the lattice form are restrained from diverging by refraction through the lens portions at the front ends of the light-emitting cores 2a and through the lens portion 3a of the over cladding layer 3 covering the lens portions of the light-emitting cores 2a.

Additionally, the vertical position of the light beams H traveling in the lattice form with respect to the back surface of the retainer plate 7 is lowered, as mentioned earlier. The light beams H are transmitted through the lens portion 3a of the over cladding layer 3 on the light-receiving side B and through the lens portions at the front ends of the respective light-receiving cores 2b. Then, the light beams H pass through the light-receiving cores 2b to reach the light-receiving element of the light-receiving module 6. The light beams entering the light-receiving cores 2b are narrowed down and converged by refraction through the lens portion 3a of the over cladding layer 3 and through the lens portions at the front ends of the light-receiving cores 2b.

An example of the operation of inputting information by means of the input device is as follows. An inputter (user) places the input device on the paper sheet K so that the back surface of the retainer plate 7 is in contact with the paper sheet K as mentioned earlier, and moves the tip of the pen P, with the tip of the pen P held into contact with a surface part of the paper sheet K revealed within the hollow input-use interior S where the light beams H travel in the lattice form as mentioned above. Because of the movement of the tip of the pen P, some of the light beams H traveling in the lattice form are intercepted by the tip of the pen P. The light-receiving element of the light-receiving module 6 senses the interception of light beams to thereby detect the path of the tip of the pen P. The path of the tip of the pen P serves as input information such as a character, a drawing, a mark or the like. When the inputter moves the tip of the pen P out of contact with the surface of the paper sheet K, the light beams are no longer intercepted, so that the input operation is not performed. In this preferred embodiment, the vertical position of the light beams H traveling in the lattice form with respect to the surface of the paper sheet K (with respect to the back surface of the retainer plate 7) is lowered. Thus, only the slight movement of the tip of the pen P out of contact with the surface of the paper sheet K enables the light beams to be no longer intercepted, so that the input operation is not performed. This allows the inputter to perform a natural input operation.

The vertical position (height) of the light beams H traveling in the lattice form with respect to the back surface of the retainer plate 7 is preferably not less than 0.2 mm from the viewpoint of eliminating the effect of a buckle in the paper sheet K, and is preferably not more than 1.5 mm from the viewpoint of allowing the inputter to perform the natural input operation as mentioned above.

Such an input device is used together with, for example, a personal computer. Specifically, when information such as a document is displayed on a display for the personal computer and a user adds information such as a character, a drawing and a mark to the displayed information, the user inputs the information such as a character into the region within the hollow input-use interior S of the input device with the pen P as described above. In response to the input operation with the pen P, the input device detects the path of the tip of the pen P, and transmits the path as a signal to the personal computer by radio or through a connecting cable, so that the information appears on the display. The information such as a character inputted by means of the input device which is superimposed on the information such as a document appears on the display.

Software (a program) for converting coordinates in the region within the hollow input-use interior S of the input device into coordinates on the screen of the display to display a character or the like inputted by means of the input device on the display is incorporated in the personal computer used herein for the purpose of displaying the character or the like inputted in the hollow input-use interior S of the input device in a position on the display corresponding to the input position. The information such as a document is, in general, previously stored in an information storage medium such as a hard disk in the personal computer and an external USB memory device, and is outputted from the information storage medium. The information appearing on the display which is the superimposition of the information such as a character inputted by means of the input device on the information such as a document may be stored in the information storage medium.

Another method of use of the input device includes the use thereof as a detection means for detecting a finger touch position on a touch panel by means of the position detection capability thereof. Specifically, the rectangular frame-shaped input device is placed along the periphery of a display screen of the touch panel, and is then used. Because of such use, when a portion of the display screen of the touch panel is touched with a finger, the light-receiving element of the light-receiving module 6 senses the interception of light beams with the finger to detect the position (coordinates) of the portion touched with the finger.

Next, an example of a method of producing the input device will be described. In the first preferred embodiment, the rectangular frame-shaped optical waveguide W is produced by individually producing the strip-shaped optical waveguide sections corresponding to the respective sides of the rectangular frame of the optical waveguide W and then connecting the strip-shaped optical waveguide sections together into the shape of the rectangular frame. It should be noted that FIGS. 3A to 3C, and 4A to 4C referenced for description on the method of producing the optical waveguide W show portions corresponding to a cross section taken along the line X-X of FIG. 1A (a cross section of the optical waveguide section on the light-receiving side B).

First, a substrate 10 for the formation of each of the strip-shaped optical waveguide sections (with reference to FIG. 3A) is prepared. Examples of a material for the formation of the substrate 10 include metal, resin, glass, quartz, and silicon.

Figure 3A:
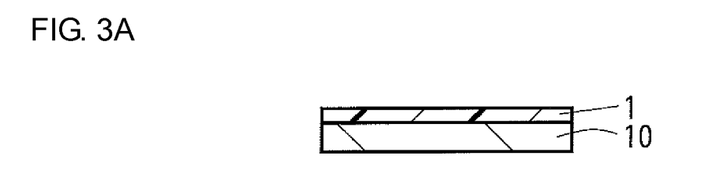
FIGS. 3A to 3C, 4A to 4C, 5A and 5B are views schematically illustrating an example of a method of producing the input device.

Then, as shown in FIG. 3A, the strip-shaped under cladding layer 1 is formed on a surface of the substrate 10. The under cladding layer 1 may be formed by a photolithographic method using a photosensitive resin as a material for the formation thereof. The under cladding layer 1 has a thickness in the range of 5 to 50 μm, for example.

Figure 3B:
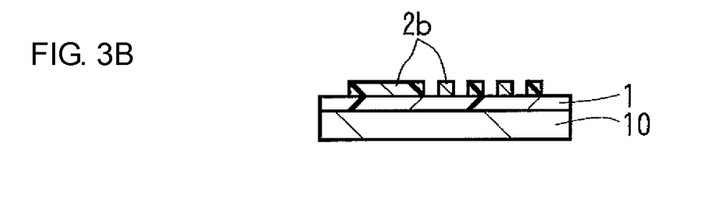

Next, in each of the optical waveguide sections corresponding to the light-emitting side A (with reference to FIG. 1A), the light-emitting cores 2a which have the aforementioned pattern are formed on the surface of the under cladding layer 1 by a photolithographic method. In each of the optical waveguide sections corresponding to the light-receiving side B (with reference to FIG. 1A), the light-receiving cores 2b which have the aforementioned pattern are formed on the surface of the under cladding layer 1 by a photolithographic method, as shown in FIG. 3B. An example of a material for the formation of the light-emitting cores 2a and the light-receiving cores 2b used herein includes a photosensitive resin having a refractive index higher than that of the materials for the formation of the under cladding layer 1 and the over cladding layer 3 to be described below (with reference to FIG. 4B). The light-emitting cores 2a are not shown in FIG. 3B because FIG. 3B is a sectional view on the light-receiving side B. The same applies to FIGS. 4A to 4C below.

Figure 3C:
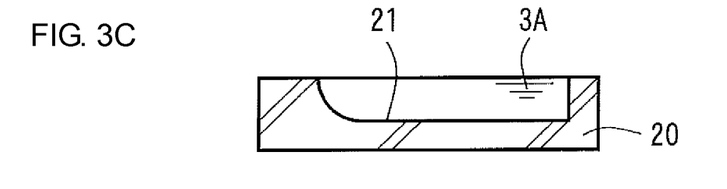

As shown in FIG. 3C, a light-transmissive mold 20 for the formation of the over cladding layer 3 is prepared. The mold 20 includes a cavity 21 having a mold surface complementary in shape to the surface of the over cladding layer 3 (with reference to FIG. 4B). The mold 20 is placed on a molding stage (not shown), with the cavity 21 positioned to face upward. Then, the cavity 21 is filled with a photosensitive resin 3A serving as the material for the formation of the over cladding layer 3.

Figure 4A:
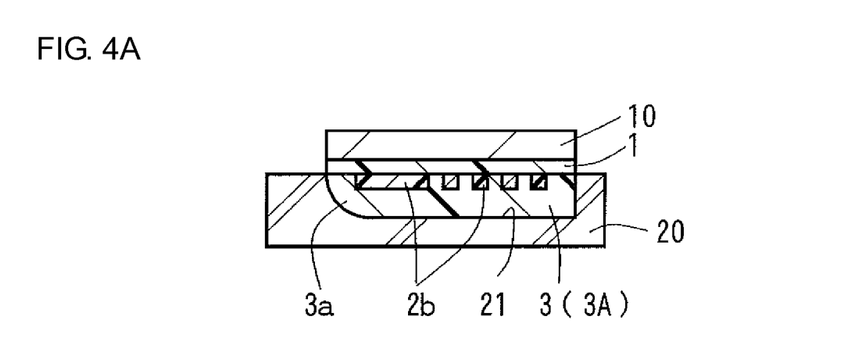

Then, as shown in FIG. 4A, the light-emitting cores 2a patterned on the surface of the under cladding layer 1 and the light-receiving cores 2b patterned on the surface of the under cladding layer 1 are positioned relative to the cavity 21 of the mold 20. In that state, the under cladding layer 1 is pressed against the mold 20, so that the light-emitting cores 2a and the light-receiving cores 2b are immersed in the photosensitive resin 3A serving as the material for the formation of the over cladding layer 3. In this state, the photosensitive resin 3A is exposed to irradiation light such as ultraviolet light by directing the irradiation light through the mold 20 onto the photosensitive resin 3A. This exposure cures the photosensitive resin 3A to form the over cladding layer 3 in which a portion thereof corresponding to the front ends of the light-emitting cores 2a and a portion thereof corresponding to the front ends of the light-receiving cores 2b are each formed as the lens portion 3a.

Figure 4B:
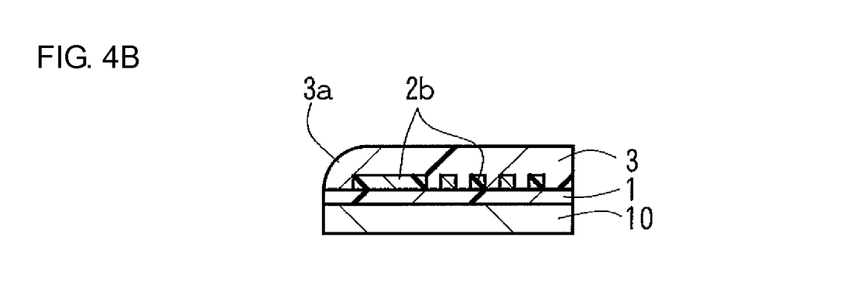

Next, as shown in FIG. 4B (shown in an orientation vertically inverted from that shown in FIG. 4A), the over cladding layer 3 is removed from the mold 20 (with reference to FIG. 4A). At this time, the over cladding layer 3 is removed together with the substrate 10, the under cladding layer 1, and the light-emitting cores 2a on the light-emitting side A (with reference to FIG. 1A), and the over cladding layer 3 is removed together with the substrate 10, the under cladding layer 1, and the light-receiving cores 2b on the light-receiving side B (with reference to FIG. 1A).

Figure 4C:
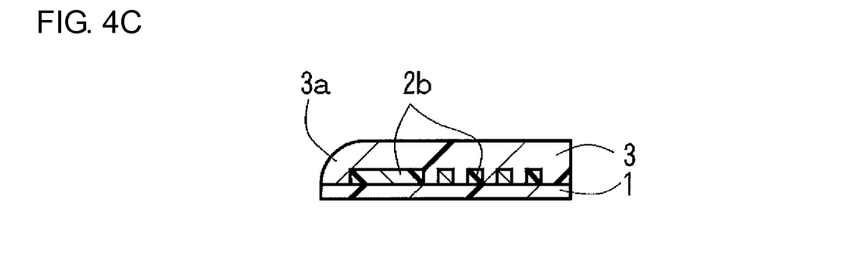

Then, as shown in FIG. 4C, the substrate 10 (with reference to FIG. 3B) is stripped from the under cladding layer 1. This stripping provides each of the strip-shaped optical waveguide sections on the light-emitting side A including the under cladding layer 1, the light-emitting cores 2a and the over cladding layer 3, and provides each of the strip-shaped optical waveguide sections on the light-receiving side B including the under cladding layer 1, the light-receiving cores 2b and the over cladding layer 3.

Figure 5A:
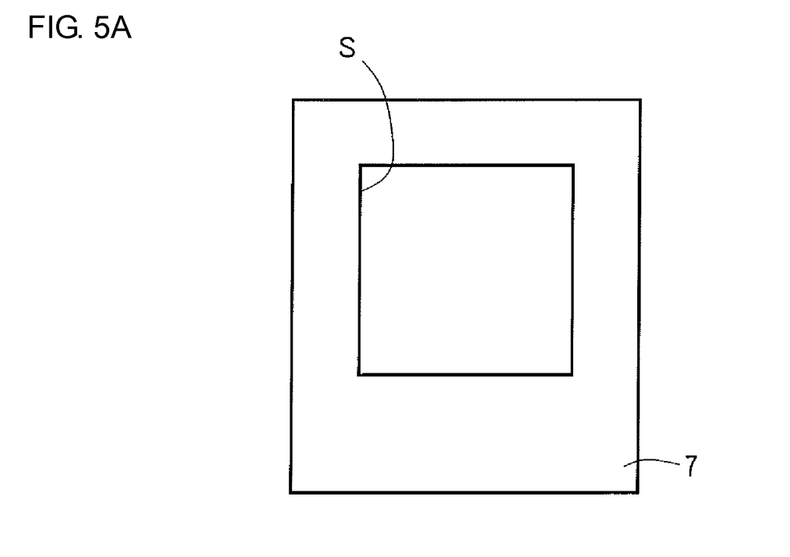

The rectangular frame-shaped retainer plate 7 having the hollow input-use interior S is prepared, as shown in plan view in FIG. 5A. Examples of a material for the formation of the retainer plate 7 include metal, resin, glass, quartz, and silicon. In particular, stainless steel is preferable in that it has a good ability to hold its planarity. The retainer plate 7 has a thickness of approximately 0.5 mm, for example.

Figure 5B:
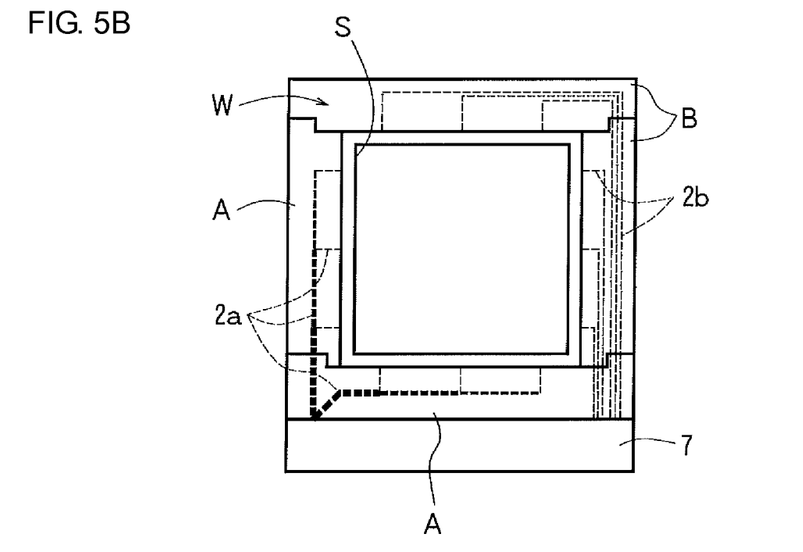

As shown in FIG. 5B, the strip-shaped optical waveguide sections are affixed in the form of a rectangular frame to the front surface of the rectangular frame-shaped retainer plate 7. At this time, the under cladding layer (with reference to FIG. 1B) is affixed on the light-emitting side A to the front surface of the retainer plate 7, and the over cladding layer 3 (with reference to FIG. 1B) is affixed on the light-receiving side B to the front surface of the retainer plate 7. In this manner, the rectangular frame-shaped optical waveguide W is produced on the front surface of the rectangular frame-shaped retainer plate 7.

Next, as shown in FIG. 1A, the light-emitting module 5 is connected to the rear ends of the light-emitting cores 2a, and the light-receiving module 6 is connected to the rear ends of the light-receiving cores 2b. At this time, the through holes 7a and 7b or recesses are formed in front surface parts of the retainer plate 7 corresponding to the light-emitting module 5 and the light-receiving module 6, respectively, as shown in FIG. 1B. Part of the light-emitting module 5 and part of the light-receiving module 6 which protrude downwardly from the optical waveguide W are received in the through holes 7a and 7b or recesses. Thereafter, the top surface of the over cladding layer 3 except the lens portion 3a, the light-emitting module 5, and the light-receiving module 6 are covered with the rectangular frame-shaped protective plate 8. Examples of a material for the formation of the protective plate 8 include resin, metal, glass, quartz, and silicon. The protective plate 8 has a thickness of approximately 0.5 mm when made of metal, and approximately 0.8 mm when made of resin, for example. In this manner, the input device shown in FIGS. 1A and 1B is produced.

Figure 6:
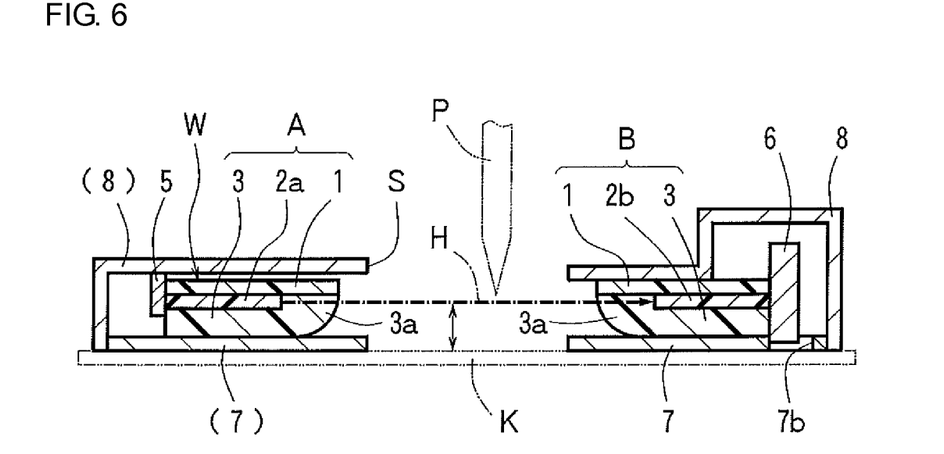
FIG. 6 is a sectional view more schematically showing the input device according to a second preferred embodiment.

FIG. 6 is a sectional view showing the input device according to a second preferred embodiment. The input device according to the second preferred embodiment is configured such that the optical waveguide section on the light-emitting side A, in which the light-emitting cores 2a are formed, in the input device according to the first preferred embodiment (with reference to FIGS. 1A and 1B) is placed upside down. Accordingly, the light-emitting module 5 is also placed upside down. Other parts of the second preferred embodiment are similar to those of the first preferred embodiment described above. Like reference numerals and characters are used in the second preferred embodiment to designate parts similar to those of the first preferred embodiment.

Also in the second preferred embodiment, the vertical position of the light beams traveling within the rectangular frame of the optical waveguide W is lowered, as in the first preferred embodiment. The protruding part of the light-emitting module 5 is positioned on the upper side. This eliminates the need to form the through hole 7a (with reference to FIG. 1B) or recess for receiving the protruding part therein in the retainer plate 7.

In the first and second preferred embodiments described above, the inner periphery of the rectangular frame-shaped retainer plate 7 and the inner periphery of the rectangular frame-shaped protective plate 8 are designed to protrude inwardly from the inner periphery of the rectangular frame-shaped optical waveguide W. However, only one of the inner periphery of the retainer plate 7 and the inner periphery of the protective plate 8 may be designed to protrude inwardly from the inner periphery of the optical waveguide W, whereas the other inner periphery is substantially flush with the inner periphery of the optical waveguide W. Alternatively, both the inner periphery of the retainer plate 7 and the inner periphery of the protective plate 8 may be flush with the inner periphery of the optical waveguide W. Also in the first and second preferred embodiments described above, the inner periphery of the retainer plate 7 and the inner periphery of the protective plate 8 on both the light-emitting side A and the light-receiving side B are designed to protrude inwardly from the inner periphery of the optical waveguide W. However, the inner peripheries of the retainer plate 7 and the protective plate 8 only on the light-receiving side B may be designed to protrude inwardly.

In the aforementioned preferred embodiments, a method in which the pen (writing implement) P is used to write on the paper sheet K therewith is given as an example of the method of inputting information. However, a thin rod, a human finger, and the like may be used in place of the pen P, if there is no need to write on the paper sheet K.

In the aforementioned preferred embodiments, a method in which the input device is used together with a personal computer and the information inputted to the input device is displayed on a display for the personal computer is given as an example of the method of the use of the input device. Alternatively, functionality similar to that of the personal computer in the aforementioned preferred embodiments may be imparted to the input device or to the display, so that information is displayed on the display without using the personal computer.

Next, inventive examples of the present invention will be described in conjunction with a comparative example. It should be noted that the present invention is not limited to the inventive examples.

EXAMPLES

Inventive Example 1

Material for Formation of Under Cladding Layer

Component A: 75 parts by weight of an epoxy resin containing an alicyclic skeleton (EHPE 3150 available from Daicel Chemical Industries, Ltd.).

Component B: 25 parts by weight of an epoxy-group-containing acrylic polymer (MARPROOF G-0150M available from NOF Corporation).

Component C: four parts by weight of a photo-acid generator (CPI-200K available from San-Apro Ltd.).

A material for the formation of an under cladding layer was prepared by dissolving the components A to C together with five parts by weight of an ultraviolet absorber (TINUVIN 479 available from Ciba Japan K.K.) in cyclohexanone (a solvent).

Material for Formation of Cores

Component D: 85 parts by weight of an epoxy resin containing a bisphenol A skeleton (157S70 available from Japan Epoxy Resins Co., Ltd.).

Component E: five parts by weight of an epoxy resin containing a bisphenol A skeleton (EPIKOTE 828 available from Japan Epoxy Resins Co., Ltd.).

Component F: 10 parts by weight of an epoxy-group-containing styrenic polymer (MARPROOF G-0250SP available from NOF Corporation).

A material for the formation of cores was prepared by dissolving the components D to F and four parts by weight of the aforementioned component C in ethyl lactate.

Material for Formation of Over Cladding Layer

Component G: 100 parts by weight of an epoxy resin having an alicyclic skeleton (EP4080E available from ADEKA Corporation).

A material for the formation of an over cladding layer was prepared by mixing this component G and two parts by weight of the aforementioned component C together.

Production of Optical Waveguide Section

The material for the formation of the under cladding layer was applied to a surface of a substrate made of stainless steel (having a thickness of 50 μm). Thereafter, a heating treatment was performed at 160° C. for two minutes to form a photosensitive resin layer. Then, the photosensitive resin layer was exposed to ultraviolet light at an integrated dose of 1000 mJ/cm$^2$. Thus, the under cladding layer having a thickness of 20 μm (with a refractive index of 1.510 at a wavelength of 830 nm) was formed.

Then, the material for the formation of the cores was applied to a surface of the under cladding layer. Thereafter, a heating treatment was performed at 170° C. for three minutes to form a photosensitive resin layer. Next, the photosensitive resin layer was exposed to ultraviolet light at an integrated dose of 3000 mJ/cm² through a photomask (with a gap of 100 µm). Subsequently, a heating treatment was performed at 120° C. for 10 minutes. Thereafter, development was performed using a developing solution (γ-butyrolactone) to dissolve away unexposed portions. Thereafter, a drying process was performed at 120° C. for five minutes. Thus, light-emitting cores (with a refractive index of 1.570 at a wavelength of 830 nm) were patterned on a light-emitting side, and light-receiving cores (with a refractive index of 1.570 at a wavelength of 830 nm) were patterned on a light-receiving side. The dimensions of the light-emitting cores and the light-receiving cores were as follows: 30 µm in width and 50 µm in height (thickness).

A light-transmissive mold for the formation of the over cladding layer was prepared. This mold includes a cavity having a mold surface complementary in shape to the surface of the over cladding layer. The mold was placed on a molding stage, with the cavity positioned to face upward. Then, the cavity was filled with the material for the formation of the over cladding layer.

Then, the light-emitting cores patterned on the surface of the under cladding layer and the light-receiving cores patterned on the surface of the under cladding layer were positioned relative to the cavity of the mold. In that state, the under cladding layer was pressed against the mold, so that the light-emitting cores and the light-receiving cores were immersed in the material for the formation of the over cladding layer. In this state, exposure was performed at an integrated dose of 8000 mJ/cm² by irradiating the material for the formation of the over cladding layer with ultraviolet light through the mold. Thus, the over cladding layer having a thickness (a thickness as measured from the surface of the under cladding layer) of 600 µm was formed in which a portion thereof corresponding to the front ends of the light-emitting cores and a portion thereof corresponding to the front ends of the light-receiving cores were each in the form of a convex lens portion. The convex lens portion had a substantially quadrantal curved lens surface (having a radius of curvature of 1.4 mm) as seen in sectional side view.

Next, the over cladding layer was removed from the mold. At this time, the over cladding layer was removed together with the substrate, the under cladding layer, and the cores.

Then, the substrate was stripped from the under cladding layer. This stripping provided each light-emitting strip-shaped optical waveguide section including the under cladding layer, the light-emitting cores and the over cladding layer, and provided each light-receiving strip-shaped optical waveguide section including the under cladding layer, the light-receiving cores and the over cladding layer.

Production of Input Device

Next, a light-emitting module incorporating a light-emitting element (SH85-2S001 (VCSEL) available from Optowell Co., Ltd.) was connected to the rear ends of the light-emitting cores, and a light-receiving module incorporating a light-receiving element (LIS-500 (CMOS image sensor) available from Panavision Imaging, LLC) was connected to the rear ends of the light-receiving cores. The amounts of protrusion of the light-emitting and light-receiving modules connected as described above from the upper surface of the over cladding layer and the amounts of protrusion thereof from the lower surface of the under cladding layer were measured. The results were as follows: the light-emitting module had no protrusion from the upper surface of the over cladding layer, and had the amount of protrusion measuring 400 µm from the lower surface of the under cladding layer; and the light-receiving module had no protrusion from the upper surface of the over cladding layer, and had the amount of protrusion measuring 900 µm from the lower surface of the under cladding layer.

A rectangular frame-shaped retainer plate made of stainless steel (having a thickness of 0.5 mm) was prepared. The retainer plate had a hollow input-use interior in the form of a rectangle that was 30 cm in length and 30 cm in width. The strip-shaped optical waveguide sections connected to the light-emitting and light-receiving modules were affixed to a portion of the front surface of the retainer plate which was outside the hollow input-use interior. At this time, the under cladding layer was affixed on the light-emitting side to the front surface of the retainer plate, and the over cladding layer was affixed on the light-receiving side to the front surface of the retainer plate. A through hole was formed in a front surface part of the retainer plate corresponding to the light-emitting module, and part of the light-emitting module protruding from the lower surface of the under cladding layer was received in the through hole. Thereafter, the top surface of the over cladding layer except the lens portion, the light-emitting module, and the light-receiving module were covered with a rectangular frame-shaped protective plate made of stainless steel (having a thickness of 0.5 mm). This provided an input device (with reference to FIGS. 1A and 1B).

Inventive Example 2

Production of Input Device

The over cladding layer was affixed on the light-emitting side to the front surface of the retainer plate as well as on the light-receiving side in Inventive Example 1 (with reference to FIG. 6). Other parts in Inventive Example 2 were similar to those in Inventive Example 1 described above.

Comparative Example

Production of Input Device

The under cladding layer of each optical waveguide section was affixed to the front surface of the retainer plate both on the light-emitting side and on the light-receiving side in Inventive Example 1 (with reference to FIGS. 7A and 7B). In Comparative Example, the retainer plate having a thickness of 1.2 mm was used because the light-receiving module had a large amount of protrusion from the lower surface of the under cladding layer.

Vertical Position of Outgoing Light Beams

In the input devices of Inventive Examples 1, 2 and Comparative Example, the thickness of the retainer plate is 0.5 mm in Inventive Examples 1 and 2, and is 1.2 mm in Comparative Example. Therefore, the vertical position of the optical waveguide is lower in Inventive Examples 1 and 2 than in Comparative Example. In other words, it is found that the vertical position of light beams traveling within the frame of the optical waveguide is low in Inventive Examples 1 and 2, as compared with that in Comparative Example.

Operation Check of Input Device

Further, a personal computer was prepared. Software (a program) for converting coordinates in the region within the hollow input-use interior of the rectangular frame-shaped optical waveguide of the input device of each of Inventive Examples 1, 2 and Comparative Example into coordinates on the screen of a display to display a character or the like inputted by means of the input device on the display is incorporated in the personal computer. The personal computer included a receiving means so as to be able to receive radio waves (information) from a wireless module of the input device. The personal computer and the input device were connected for transmission of information therebetween by radio.

The input device in each of Inventive Examples 1, 2 and Comparative Example described above was placed on a paper sheet, with the stainless steel retainer plate facing downwards. Then, a character was inputted with a pen into the paper sheet revealed in the region within the hollow input-use interior. The result in Inventive Examples 1 and 2 was that the input operation was stopped when the tip of the pen was moved slightly out of contact with the surface of the paper sheet, so that a natural input operation was achieved. On the other hand, the result in Comparative Example was that the tip of the pen had to be moved far from the surface of the paper sheet to stop the input operation, so that an unnatural input operation was performed.

The input device is applicable to the addition of new information such as characters, drawings and marks to documents and the like appearing on a display, and to a detection means for detecting a finer touch position on a touch panel.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An input device, comprising:
a retainer plate in the form of a frame;
an optical waveguide in the form of a frame, the optical waveguide being provided on a front surface of the retainer plate such that the frame of the optical waveguide is aligned with the frame of the retainer plate, the optical waveguide having first and second sections opposed to each other in the form of the frame, the first section including light-emitting cores disposed in a predetermined pattern, the second section including light-receiving cores disposed in a predetermined pattern, the light-emitting cores and the light-receiving cores having respective front end surfaces positioned on inner edges of the frame, the front end surfaces of the light-emitting cores and the front end surfaces of the light-receiving cores being opposed to each other, the optical waveguide further including an over cladding layer having an edge portion covering the front end surfaces of the light-emitting and light-receiving cores, the edge portion of the over cladding layer being in the form of a lens portion;
a light-emitting element connected to rear ends of the light-emitting cores of the optical waveguide; and
a light-receiving element connected to rear ends of the light-receiving cores of the optical waveguide, the light-receiving element including a light-receiving section disposed in an upper part thereof, the light-receiving element having a lower end portion positioned closer to the retainer plate,
wherein the optical waveguide has a light-receiving optical waveguide section in which the light-receiving cores are formed, the light-receiving optical waveguide section and the light-receiving element being placed upside down so that the light-receiving section is positioned in a lower part of the light-receiving element and so that the lower end portion of the light-receiving element is positioned above the light-receiving optical waveguide section,
whereby light beams emitted from the light-emitting element, passing through the light-emitting cores, exiting the lens portion of the over cladding layer covering the front end surfaces of the light-emitting cores, and traveling within the frame of the optical waveguide are designed so that the vertical position of the light beams is low with respect to the back surface of the retainer plate.

2. The input device according to claim 1, wherein at least a light-receiving part of the inner periphery of the frame-shaped retainer plate protrudes inwardly from the inner periphery of the frame-shaped optical waveguide.

3. The input device according to claim 1, wherein the frame-shaped optical waveguide is covered with a frame-shaped protective plate, and at least a light-receiving part of the inner periphery of the frame-shaped protective plate protrudes inwardly from the inner periphery of the frame-shaped optical waveguide.

4. The input device according to claim 2, wherein the frame-shaped optical waveguide is covered with a frame-shaped protective plate, and at least a light-receiving part of the inner periphery of the frame-shaped protective plate protrudes inwardly from the inner periphery of the frame-shaped optical waveguide.

* * * * *